Aug. 19, 1924.
O. L. VINCENT
1,505,449
AUTOMATIC GRADE CROSSING SIGNAL
Filed Jan. 15, 1924  4 Sheets-Sheet 1
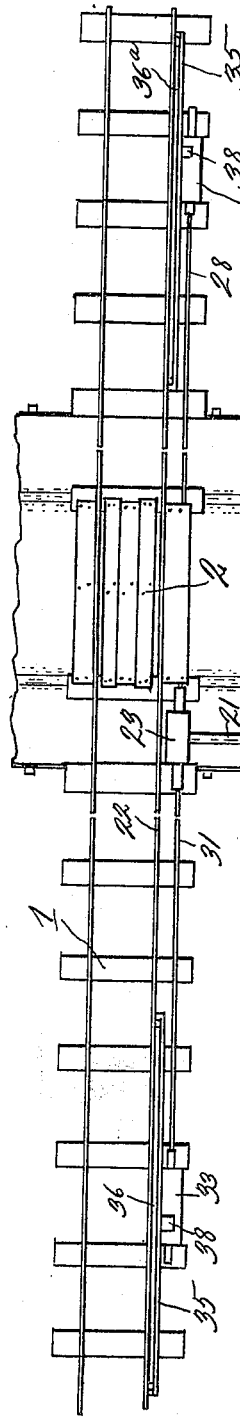
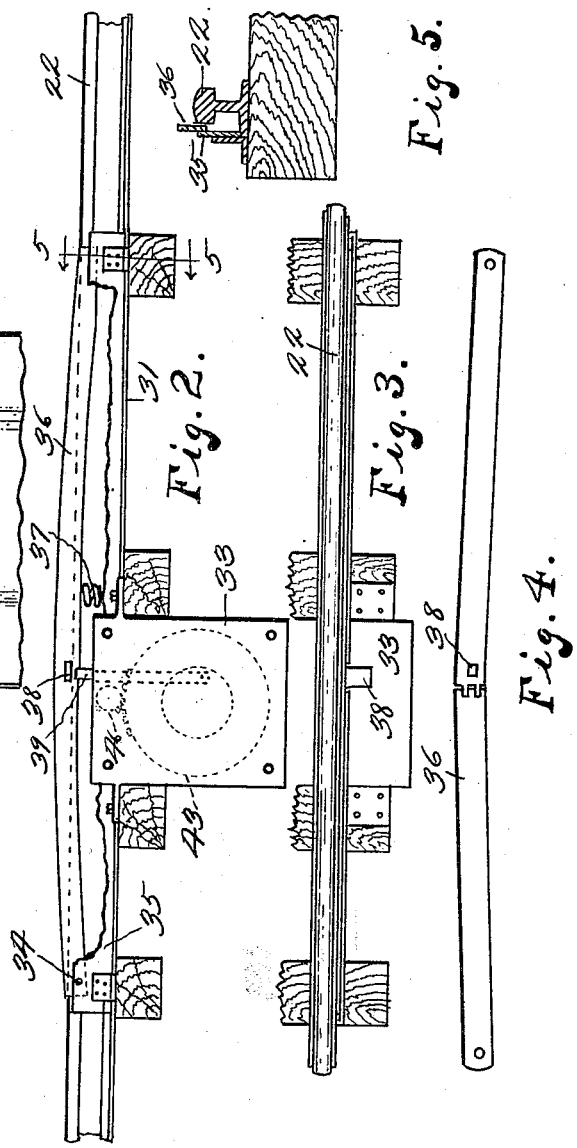
INVENTOR.
O. L. Vincent
BY
ATTORNEY.

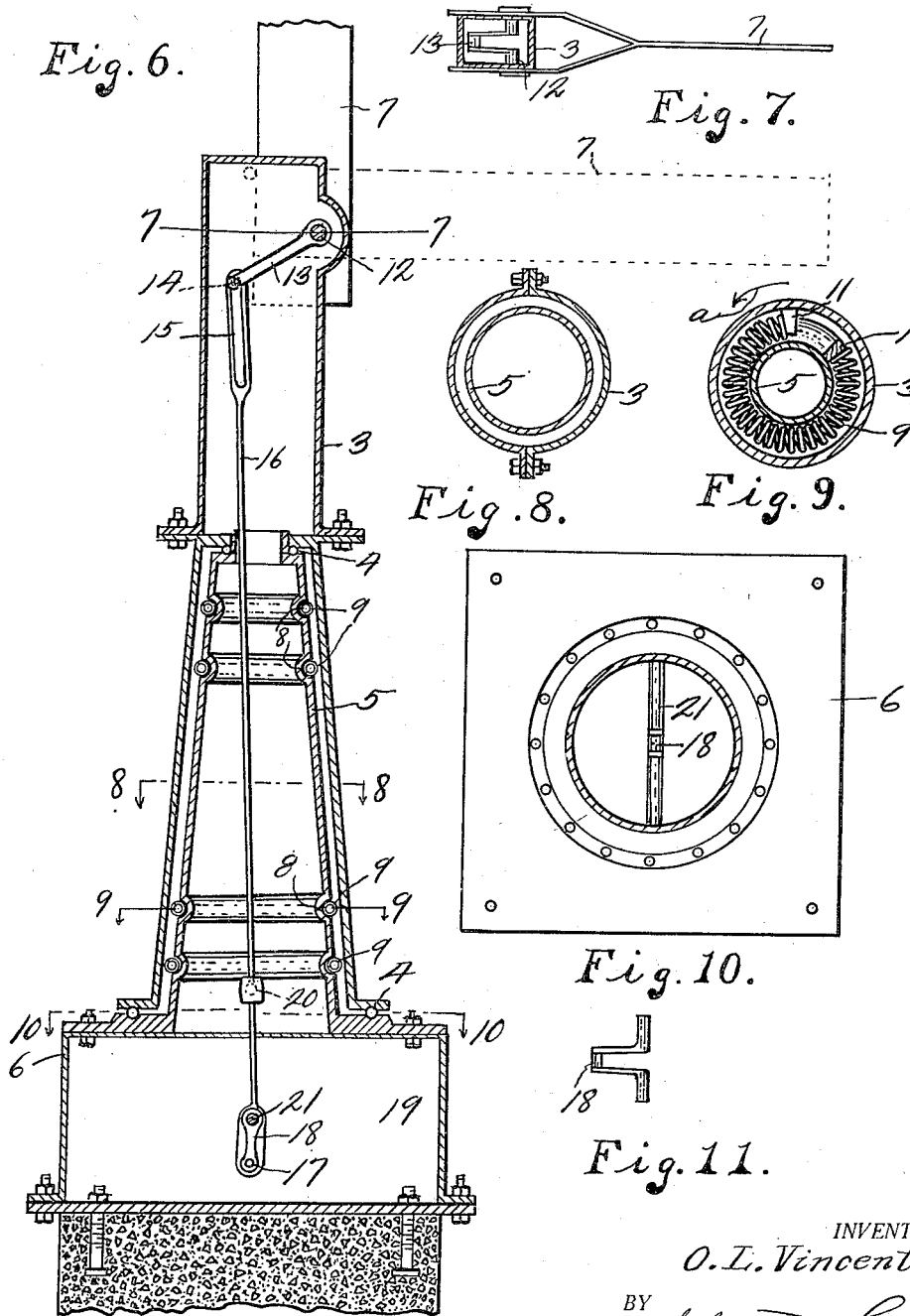

Aug. 19, 1924.
O. L. VINCENT
1,505,449
AUTOMATIC GRADE CROSSING SIGNAL
Filed Jan. 15, 1924   4 Sheets-Sheet 3
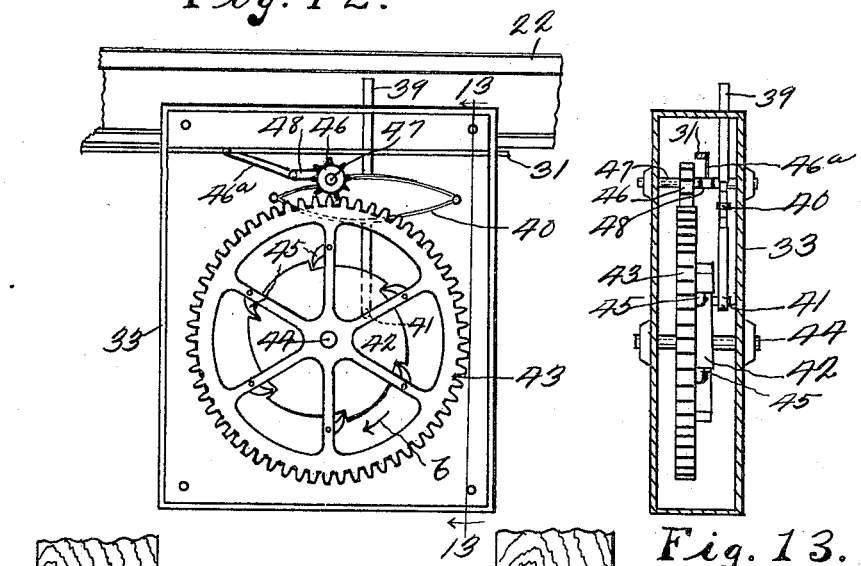
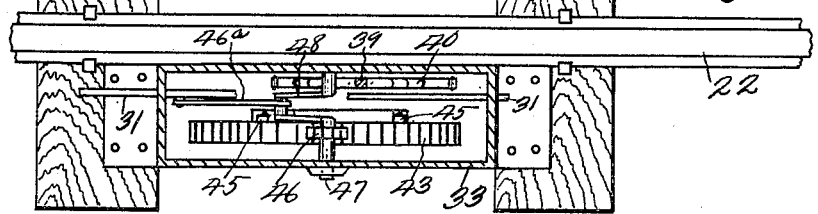
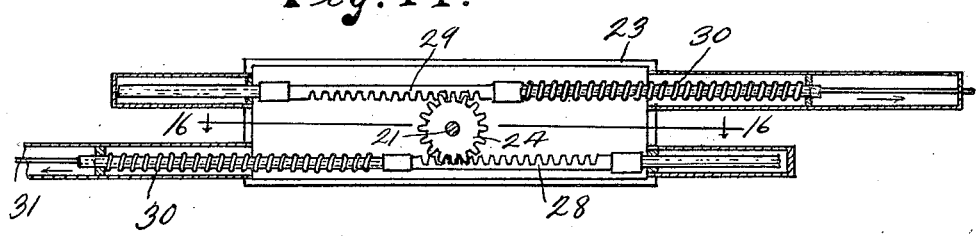
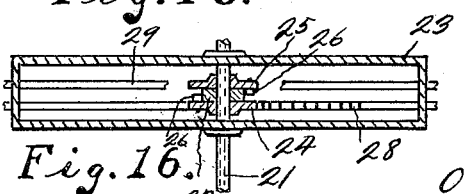
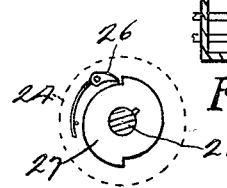
INVENTOR.
O. L. Vincent
BY
Philip A. H. Sewell
ATTORNEY.

Aug. 19, 1924.
O. L. VINCENT
1,505,449
AUTOMATIC GRADE CROSSING SIGNAL
Filed Jan. 15, 1924    4 Sheets-Sheet 4
Fig. 18.
Fig. 19.
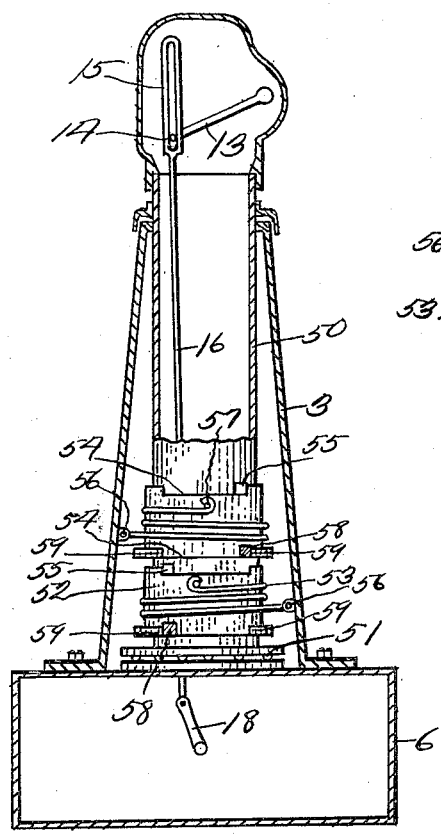
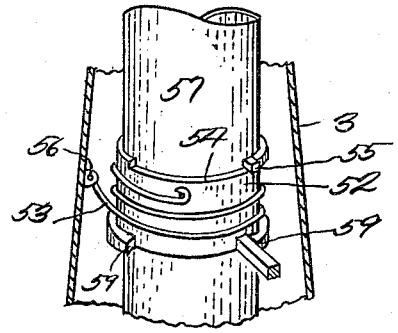
INVENTOR.
O. L. Vincent
BY
Philip A. Ferrell
ATTORNEY.

Patented Aug. 19, 1924.

1,505,449

UNITED STATES PATENT OFFICE.

ORVILLE L. VINCENT, OF OMAHA, NEBRASKA.

AUTOMATIC GRADE-CROSSING SIGNAL.

Application filed January 15, 1924. Serial No. 686,311.

*To all whom it may concern:*

Be it known that ORVILLE L. VINCENT, citizen of the United States, residing at Omaha, in the county of Douglas and State of Nebraska, has invented certain new and useful Improvements in Automatic Grade-Crossing Signals, of which the following is a specification, reference being had therein to the accompanying drawings.

The invention relates to automatic grade crossing signals, and has for its object to provide a device of this character which will afford ample warning to drivers of vehicles when a train is approaching the crossing from either direction, and at the same time will not interfere with traffic on highways by prohibiting it from crossing the railway until a slowly approaching train, at a safe distance from the crossing has first passed, thereby allowing drivers of vehicles, if desired, to cross over the track without being unduly detained. The above result is obtained by a pivoted member supporting the signal arm, which allows vehicles to leave the crossing if the arm moves to signalling position while on the crossing.

A further object is to provide a railroad signal comprising a signal standard adjacent the crossing and provided with a pivoted arm, and to provide depressible members of opposite sides of the crossing, adapted to be engaged by the over reaching tread of the wheels on the outside of the track, for actuating mechanism connected to the pivoted signalling arm for moving the same to a horizontal position upon approach of a train, and for moving the arm to inoperative vertical position after the train has passed the crossing.

A further object is to provide ratchet means whereby upon the operation of either depressible member, the other depressible member will remain in normal position until depressed.

A further object is to provide a vertically disposed pivot standard for the signalling arm, normally held in one position by means of springs, which springs, return the pivoted member to normal position after manual operation thereof.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a top plan view of a portion of a railway and crossing, showing the signalling device applied thereto.

Figure 2 is a side elevation of a portion of the railway and one of the depressible members.

Figure 3 is a top plan view of one of the depressible members, showing the same adjacent a rail.

Figure 4 is a side elevation of a modified form of depressible member.

Figure 5 is a sectional view taken on line 5—5 of Figure 2.

Figure 6 is a vertical transverse sectional view through the signal arm standard.

Figure 7 is a horizontal sectional view taken on line 7—7 of Figure 6.

Figure 8 is a horizontal sectional view taken on line 8—8 of Figure 6.

Figure 9 is a horizontal sectional view taken on line 9—9 of Figure 6.

Figure 10 is a horizontal sectional view taken on line 10—10 of Figure 6.

Figure 11 is a detailed view of the crank.

Figure 12 is an enlarged side elevation of the mechanism actuated by one of the depressible members.

Figure 13 is a sectional view taken on line 13—13 of Figure 12.

Figure 14 is a top plan view of the depressible member actuated mechanism, showing the same adjacent a rail.

Figure 15 is a side elevation of the signal standard operating mechanism adjacent track.

Figure 16 is a horizontal sectional view taken on line 16—16 of Figure 15.

Figure 17 is a detailed view shown in side elevation one of the dog actuated discs.

Figure 18 is a vertical section through a modified form of standard.

Figure 19 is a detail perspective view of a portion of standard shown in Figure 18.

Referring to the drawing, the numeral 1 designates a railway and 2 a railway crossing. It has been found that accidents occur at railroad crossings because of inadequate signalling means for warning persons of the approach of a train from either direction, and where signalling devices are used of a barrier type, no means is provided for allowing a vehicle to cross if the barrier is operated when a vehicle is on a crossing, or for allowing a vehicle to cross when the train is at a considerable distance from the crossing and a person can easily cross without danger. To obviate this difficulty the signal standard 3 is provided, which standard is supported on ball bearings 4 which are interposed between the standard 3 and the tapered vertical extension 5 of the base 6 in a manner whereby the standard 3 may rotate when pressure is applied against the pivoted arm 7, when in lowered position as shown in dotted lines in Figure 6, thereby allowing a person or vehicle to pass, even though the arm 7 is in a lowered position. Disposed in annular grooves 8 of the extension 5 are coiled springs 9, one of which engages lugs 10 carried by the extension 5, and the other ends engage integral inwardly extending lugs 11 carried by the inner periphery of the standard 3, therefore it will be seen that the standard 3 may be moved in the direction of the arrow a for partially rotating the standard 3 sufficiently to allow a vehicle to pass before the train reaches the crossing, even though the arm is in operative position. Upon release of the arm the coiled springs 9 cooperate with the lugs 11 and return the standard 3 and the arm 7 to its normal position at a right angle to the roadway. The arm 7 is carried by a shaft 12, which extends into the upper end of the standard 3, and is provided with an arm 13, the free end of which is provided with a lug 14, which extends into an elongated slot 15 of a connecting rod 16, whereby when the connection rod 16 is moved upwardly the arm 7 will be lowered, and when moved downwardly the arm 7 will be raised. The elongated slot 15 also allows the arm 7 to be moved upwardly incident to manual operation, or if the arm, which is counterbalanced, should come into engagement with a vehicle, at which time the mechanism hereinafter set forth would continue to move independent of the arm 7, and no damage could result to the vehicle, for the reason that the standard 3 would rotate on its bearing 4.

Connecting rod 16 extends downwardly through the extension 5 and is pivotally connected at 17 to a crank 18 disposed in the chamber 19 of the base, however it is provided with a swivel connection 20, whereby the standard 3 may freely rotate without interference from the crank 18. Crank 18 is operated by a crank shaft 21, which extends towards the adjacent rail 22 of the railway, and into the casing 23 adjacent the outer side of said rail 22. Rotatably mounted on the shaft 21 within the casing 23 are spaced gears 24 and 25, which gears on their inner side are provided with spring pressed dogs 26, which dogs cooperate with a relatively wide ratchet wheel 27, which is secured to the shaft 21, and are in opposed relation to each other, whereby upon the rotation of either gear 24 or 25, a rotation of the ratchet wheel 27 and consequently the shaft 21 will take place in a manner whereby said shaft will be rotated about one hundred and eighty degrees, thereby rotating the crank 18 one hundred and eighty degrees from imparting a longitudinal movement on the connection rod 16 in either direction according to which gear 24 or 25 is rotated. During the rotation of one gear 24 or 25 the other gear is not rotated, the purpose of which will presently appear. Slidably mounted within the casing 23 are racks 28 and 29, which racks are held in normal inoperative position by means of coiled springs 30. Rack 28 has connected thereto a rod 31, which rod extends along the rail 22 to one side of the crossing 2, and into a gear box adjacent the rail 22 and is slidably mounted therein. Pivotally connected at 34 to a plate 35 disposed adjacent the rail 22 is a trip bar 36, which trip bar is adapted to be depressed by the engagement of the wheels of an overmoving train therewith. The trip bar is forced downwardly against the action of the coiled spring 37 and the horizontal lug 38 carried by one side thereof engages the upper end of the vertically movable shaft 39. The shaft 39 extends downwardly into the casing 33, and intermediate its end is provided with an elliptic spring 40, which spring takes up the shock incident to the initial operation of the device, and prevents damage to the mechanism incident to sticking of any part thereof. The lower end of the shaft 39 is pivotally connected at 41 to a ratchet wheel 42, and when depressed rotates the ratchet wheel 42 substantially sixty degrees to the gear wheel 43, which is also carried by the shaft 44, and tiltable on said shaft, however upon the rotation of the ratchet wheel 42 in the direction of the arrow b, Figure 12, the ratchet wheel and gear 43 are in interengagement through the medium of the dogs 45, and consequently rotate the same distance. Disposed above the gear 43 is a pinion 46, which pinion is mounted on a shaft 47. Shaft 47 is provided with a crank 48, which is in turn provided with a connecting rod 49, which connects the crank to the rod 31, and consequently when the pinion 46, which is carried by the shaft 47 is fully revolved through the action of the gear 43 the rod 31 is longitudinally moved thereby producing a reciprocating movement of the rod 31, and consequently the signal arm connection rod 16 is longitudinally moved through the mechanism set forth, and the signal arm 7 moved to operative position as shown in dotted lines in Figure 6.

During this operation the rack bar 28 is not moved as the ratchet wheel 27 is rotated in a manner whereby it will not be locked to the gear 24. However after the train passes the crossing it engages the depressible trip bar 36ª at the opposite side of the crossing 2, and actuates the bar 28 for imparting a rotation to the crank 18 and forcing the connecting rod 16 downwardly, consequently restoring the signalling arm 7 to inoperative position as shown in full lines in Figure 6.

Referring to Figures 18 and 19 wherein a modified form of standard is shown, the post 50 is supported on ball bearings 51 at its lower end, and is rotatably mounted within the casing 3. Post 50 adjacent its lower end is provided with sleeves 52, around which sleeves coiled springs 53 extend in opposed relation, and form means for normally maintaining the post 50 in one position where the signal arm will under normal condition extend across the roadway. The sleeves 52 at their upper sides are provided with cutaway portions 54, into which portions lugs 55 carried by the post extend and engage the opposite ends of said cutaway portions, and hold the sleeves against the actions of the opposed springs 53. When the post 50 is rotated ninety degrees in either direction one of the sleeves will be forced around with said post by one of the lugs 55, according to the direction of rotation of the post. When the post is released after a pivotal operation, the spring which has been tensioned will return the post to normal position. The springs 53 are anchored at 56 to the inner side of the casing 3, and at 57 to the sleeves 52, and consequently said springs will be tensioned according to the rotation of the post 50. Extending inwardly from the inner side of the casing 3 are stop arms 58, which arms extend into the path of shoulders 59 carried by the sleeves and consequently during the rotation of the sleeves with the post 50, will limit the movement of the post preferably to ninety degrees.

From the above it will be seen that an automatic railroad crossing signal is provided, which signal is positive in its action, and movement from inoperative to operative positions entirely train controlled, and constructed in a manner whereby it will not damage a vehicle if the signal arm is lowered thereon, nor will it prevent passage of a vehicle in case of emergency, for instance where the train is too far from the crossing to be of danger.

The invention having been set forth what is claimed as new and useful is:—

1. The combination with a pivoted arm train actuated signal for railroad crossings, of a support for said arm, said support being rotatably mounted, means for actuating said arm extending upwardly through the support, and means whereby upon a downwardly movement of the arm into engagement with an object, said actuating means will continue to operate.

2. A railroad crossing signal comprising a standard disposed adjacent the crossing, train actuated depressible members at opposite sides of the crossing, vertically disposed shafts depressed by said depressible members, yieldable connections carried by said shaft, a ratchet wheel to which the shafts are pivoted, gear wheel, ratchet connections between the ratchet wheels and gear wheels, longitudinally movable rack bars, cranks operated by the gear wheels for intermittently reciprocating the rack bars, gear wheels meshing with the rack bars, a ratchet between the gear wheel, dogs carried by the gear wheels and cooperating with the last named ratchet wheel for intermittently rotating the same, a shaft adjacent the crossing on which said ratchet wheel is mounted, said last named shaft being provided with a crank, a pivoted signalling arm and a connecting rod between the crank and signalling arm.

3. A railroad crossing signal comprising a vertically disposed pivoted standard, an arm pivoted to said standard, a crank arm carried by said arm and disposed within the standard, a base on which said standard is mounted, a crank disposed within the base, means for intermittently rotating said crank one half turn, a connection rod connecting the crank and the crank arm, spring means for normally maintaining the standard in normal position, and a pivotal connection carried by connecting rod.

4. The combination with a railroad crossing pivoted signalling arm, of a vertically disposed rotatable standard for said arm, spring means for normally maintaining the arm at a right angle to the crossing and means extending upwardly through the standard for operating the signalling arm.

5. The combination with a railroad crossing pivoted signalling arm, a rotatable standard for said arm, of a reciprocated connecting rod for controlling the signalling arm, said rod being provided with a swivel connection, a crank arm carried by the signalling arm within the standard and a slot and lug connection between the crank arm and the connecting rod.

6. The combination with a railroad crossing signal, a pivoted signalling arm, a rotatable standard on which said signalling arm is mounted, a member extending upwardly into the standard, of means for returning the standard to normal position after a partial rotation thereof, said means comprising annular coiled springs disposed in annular grooves of the upwardly extending member and having their ends adjacent each other, one of the ends of the springs engaging lugs within the annular grooves and their other ends engaging lugs carried by the standard and extending into the annular grooves.

7. The combination with a train actuated vertically disposed signal arm post, said post being pivotally mounted, of means for normally maintaining said post in one position and allowing the post to be rotated in either direction, said means comprising sleeves surrounding the post, coiled springs surrounding the sleeves and in opposed positions, one end of said coiled springs being anchored to the sleeves, the other end of said coiled springs being anchored to a support, lugs carried by the post and disposed between spaced shoulders carried by the sleeve and lugs carried by the support and disposed between spaced shoulders carried by the sleeves.

In testimony whereof I hereunto affix my signature.

ORVILLE L. VINCENT.